United States Patent [19]

Larson

[11] Patent Number: 4,986,960
[45] Date of Patent: Jan. 22, 1991

[54] TWO PIECE END FITTING WITH HAIRPIN SPRINGS

[75] Inventor: Jeffrey G. Larson, Rustburg, Va.

[73] Assignee: The Babcock & Wilcox Company, New Orleans, La.

[21] Appl. No.: 302,872

[22] Filed: Jan. 30, 1989

[51] Int. Cl.⁵ ............................................. G21C 3/32
[52] U.S. Cl. .................................... 376/446; 376/224
[58] Field of Search ............................... 376/446, 224

[56] References Cited

U.S. PATENT DOCUMENTS

| | | | |
|---|---|---|---|
| 3,475,273 | 10/1969 | Krawied | 176/78 |
| 3,515,638 | 6/1970 | Nims, Jr. | 176/28 |
| 3,600,276 | 8/1971 | Nims, Jr. | 176/28 |
| 3,689,358 | 9/1972 | Smith | 176/78 |
| 3,770,583 | 11/1973 | Klumb | 176/76 |
| 3,801,453 | 4/1974 | Jones | 176/78 |
| 4,072,562 | 2/1978 | Sankovich | 176/50 |
| 4,072,564 | 2/1978 | Jabsen | 176/76 |
| 4,076,586 | 2/1978 | Bideau | 176/76 |
| 4,078,969 | 3/1978 | Garin | 176/87 |
| 4,192,716 | 3/1980 | Anthony | 176/78 |
| 4,208,249 | 6/1980 | Jabsen | 176/78 |
| 4,278,501 | 7/1981 | Steinke | 176/78 |
| 4,420,457 | 12/1983 | Le Pargneux | 376/446 |
| 4,427,624 | 1/1984 | Marlatt | 376/352 |
| 4,534,933 | 8/1985 | Gierjsen | 376/364 |
| 4,551,300 | 11/1985 | Feutrel | 376/364 |
| 4,560,532 | 12/1985 | Barry | 376/434 |
| 4,631,166 | 12/1986 | Camden | 376/435 |
| 4,645,642 | 2/1987 | Lellerco | 376/364 |
| 4,729,868 | 3/1988 | Gillett | 376/285 |
| 4,792,429 | 12/1988 | Hatfield | 376/446 |

FOREIGN PATENT DOCUMENTS

| | | | |
|---|---|---|---|
| 2589535 | 5/1987 | France | 376/446 |

Primary Examiner—Donald P. Walsh
Assistant Examiner—Meena Chelliah
Attorney, Agent, or Firm—R. J. Edwards; D. Neil LaHaye

[57] ABSTRACT

An end fitting for a fuel assembly. A lower plate having a pin extending perpendicular thereto at each corner slidably receives a main body portion on the pins. Stop washers or nuts on the pins prevent the main body portion from sliding off the pins. A hairpin shaped spring along each side of the main body portion is positioned between the plate and main body portion to resiliently bias them apart. The end of the spring against the lower plate is offset from the end of the plate to preload the spring tension.

9 Claims, 2 Drawing Sheets

TWO PIECE END FITTING WITH HAIRPIN SPRINGS

BACKGROUND OF THE INVENTION

1. Field of the Invention

The present invention is generally related to fuel elements for nuclear reactor cores and, in particular, to a holddown spring arrangement for securing fuel assemblies in the nuclear reactor core.

2. General Background

Typically, a nuclear reactor for the generation of electrical power includes a core of fissionable material to heat a coolant flowing up therethrough. The fissionable material is enclosed in elongated fuel rods assembled in a square array called fuel assemblies. The fuel rods are held in spaced parallel relationship by a number of spacer grids distributed at intervals along the length of the assembly. The fuel assemblies are held in an array by core grid plates at the top and bottom and are provided with upper and lower end fittings for mating with the grid plates. Typically, hold down spring means is provided between the upper end fitting and the upper core grid plate. This is necessary to provide sufficient hold down force against hydraulic lift forces in the core as generated by coolant flow. The springs also allow for axial dimensional growth of the fuel assembly due to either differential thermal expansion or irradiation induced material change. The problems of design, therefore, are in the ability to provide sufficient hold down force against hydraulic lift while allowing sufficient room for growth. Sufficient material strength and stiffness must be available within a limited volume area. The stiffness/volume efficiency of a spring becomes very important when used for nuclear fuel hold down.

Known devices which address this problem include the following.

U.S. Pat. No. 4,551,300 entitled "Nuclear Reactor Fuel Assembly End Fitting" discloses an end fitting having a plurality of rigid levers and elastic means in recesses in the end fitting which exert a restoring torque on corresponding levels.

U.S. Pat. Nos. 4,072,562 and 4,072,564 disclose the use of torsion bars as hold down means.

U.S. Pat. Nos. 4,671,924; 3,801,453; 4,427,624; 4,631,166; 4,420,457; and 4,560,532 disclose the use of leaf springs as hold down means.

U.S. Pat. Re. Nos. 31,583; 3,475,273; 3,515,638; 3,600,276; 3,689,358; 3,770,583; 4,076,586; 4,078,969; 4,192,716; 4,208,249; 4,278,501; 4,534,933; 4,551,300; and 4,729,868 disclose the use of a variety of hold down devices including helical springs and are representative of the general state of the art.

The known devices leave room for improvement. Leaf springs tend to be stroke limited and often must be ganged to achieve sufficient hold down force. As fuel assemblies are typically only eight inches square, there is generally inadequate dimension available to obtain sufficient flexure of the bar. Helical springs must be positioned to allow access of control rods and are fully exposed to coolant flow which subjects the springs to the dynamic stresses of flow induced vibration. Also, reconstitution of a fuel assembly utilizing the helical spring design is a relatively complex operation.

SUMMARY OF THE INVENTION

The present invention solves the aforementioned problems in a straightforward manner. What is provided is a two-piece upper end fitting with a spring design which overcomes the limitations of known devices. The lower portion of the upper end fitting is provided with a guide pin at each corner. The box portion of the upper end fitting is slidably received on the pins and retained thereon by suitable means. Hairpin shaped springs are positioned out of the coolant flow along the sides of the upper end fitting.

BRIEF DESCRIPTION OF THE DRAWINGS

For a further understanding of the nature and objects of the present invention, reference should be had to the following description, taken in conjuction with the accompanying drawings, in which like parts are given like reference numerals and, wherein.

DETAILED DESCRIPTION OF THE PREFERRED EMBODIMENTS

Figure 1:
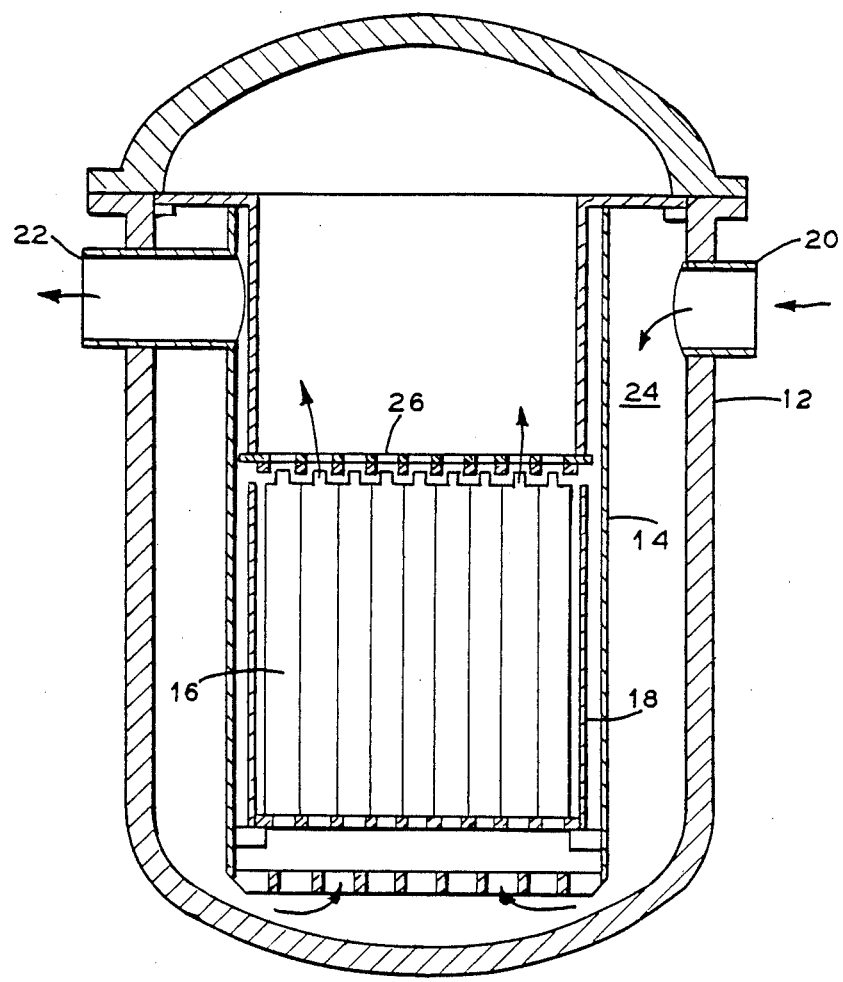
FIG. 1 is a sectional view of a typical reactor vessel.
Figure 2:
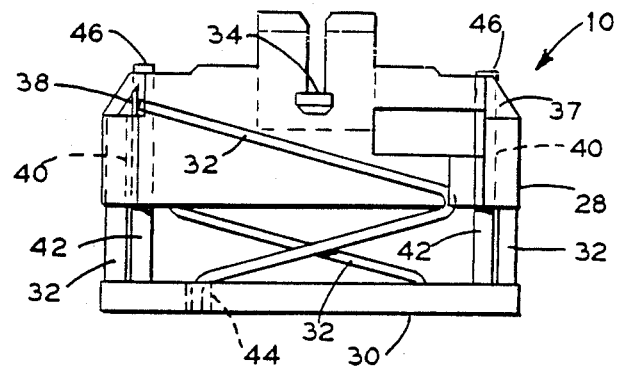
FIG. 2 is a side view of the invention.

Referring to the drawings, it is seen in FIG. 2 that the invention is generally referred to by the numeral 10. As seen in FIG. 1 nuclear reactor vessel 12 is generally comprised of core support structure 14, fuel assemblies 16, shroud 18, inlet nozzle 20, and outlet nozzle 22. The flow of coolant through reactor vessel 12, as symbolized by the arrows, is down annulus 24 via inlet 20, up through and around fuel assemblies 16, and out to steam generators not shown through outlet 22. End fitting 10 is positioned between fuel assemblies 16 and upper grid plate 26. End fitting 10 is generally comprised of main body portion 28, lower plate 30, and spring means 32.

Figure 3:
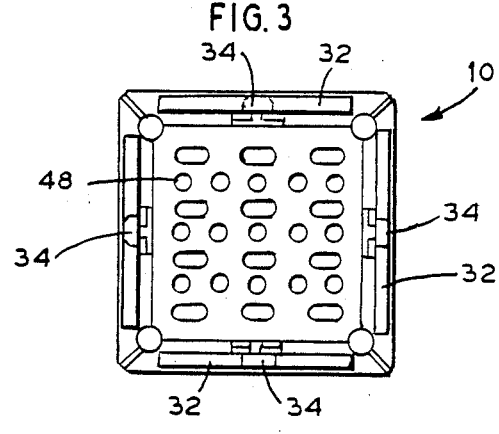
FIG. 3 is a top view of the invention.
Figure 4:
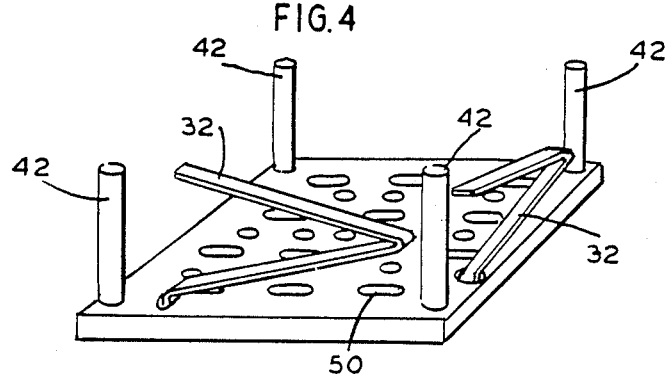
FIG. 4 is a view of the lower portion of the end fitting of the invention.

Main body portion 28, as seen in side view in FIG. 2 and partial cutaway top view in FIG. 3, is substantially box shaped and has two open opposed sides. An outwardly extending shoulder 34 is provided adjacent the upper edge and substantially at the midpoint of each side of main body portion 28. Shoulders 34 contact upper grid plate 26 in the core of reactor vessel 12 to retain end fitting 10 in the installed position. Upward pressure is provided from fuel assemblies below end fitting 10 and are typically in contact with end fitting 10 by means of guide tubes not shown. Main body portion 28 is provided with slots 38 adjacent the upper portion of each corner for receiving one end of spring means 32. An aperture 39 or handling window is provided on at least one side of main body portion 28 for ease of handling end fitting 10 during initial assembly or reconstitution of fuel assemblies 16. A bore 40 is provided at each corner and along the longitudinal axis of main body portion 28 for slidable mounting relative to lower plate 30.

Lower plate 30 is square or rectangular in shape and provided with a guide pin 42 at each corner. In the preferred embodiment, guide pins 42 are threadably engaged in a bore in lower plate 30 and then tack welded in place. A slot 44 is provided in lower plate 30 on each side and offset from the end for receiving one end of spring 32. Lower plate 30 is adapted for attachment to fuel assemblies 16 by guide tubes or other suitable means known in the industry. Bores 48 are provided in lower plate 30 for passage of guide tubes therethrough. Openings 50 are provided in lower plate 30 for flow of coolant therethrough. The pattern shown is for illustrative purposes only and may be adapted to suit the particular application.

In the preferred embodiment, spring means 32 is in the shape of a sideways V or hairpin spring. Spring 32 has a first angled end designed to fit into slot 44 in lower plate 30. The second straight end is received in slot 38 in main body portion 28 and welded in place. The first end of spring 32 is offset from the end of lower plate 30. This causes end fitting 10 to have preloaded tension against guide tubes used in fuel assemblies 16 and it is less prone to vibration induced spring failure. In the assembled state, main body portion 28 is resiliently biased away from lower plate 30. In this manner, pressure against lower plate 30 from fuel assemblies 16 is accommodated by compression of spring 32 and movement of lower plate 30 toward main body portion 28. Main body portion 28 is prevented for sliding off guide pins 42 by the use of stop means 46 attached to the end of each guide pin 42 after main body portion 28 has been mounted thereon. It should be noted that any suitable means such as a stop washer or a nut engaged on the end of each guide pin 42 may be used.

In operation, end fitting 10 is assembled by welding the second end of spring 32 in slot 38 of main body portion 28. The first end of spring 32 is inserted into slot 44 in lower plate 30 as main body portion 28 is slidably mounted on pins 42. Stop means 46 is then attached to the end of pins 42 to prevent main body portion 28 from sliding off pins 42. During initial assembly of a reactor fuel assembly or during retrofit operations while reconstituting a fuel assembly, lower plate 30 is then attached to the top of a fuel assembly 16 by any suitable means known in the industry.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. An upper end fitting for a nuclear fuel assembly, comprising:
   a. a main body portion;
   b. a lower plate slidably attached to said main body portion; and
   c. a substantially hairpin shaped spring positioned between said main body portion and said lower plate whereby said main body portion is resiliently biased away from said lower plate.

2. The end fitting of claim 1, wherein one of said springs is positioned along each side of said main body portion.

3. The end fitting of claim 1, wherein said main body portion is substantially box shaped having two open opposed sides.

4. The end fitting of claim 1, wherein the end of said spring against said lower plate is offset from the end of said plate.

5. An upper end fitting for a nuclear fuel assembly, comprising:
   a. a main body portion which is substantially box shaped having two open opposed sides;
   b. a lower plate slidably attached to said main body portion; and
   c. a substantially hairpin shaped spring positioned along each side of said main body portion between said main body portion and said lower plate whereby said main body portion is resiliently biased away from said lower plate.

6. The end fitting of claim 5, wherein the end of said spring against said lower plate is offset from the end of said plate.

7. An upper end fitting for a nuclear fuel assembly, comprising:
   a. a main body portion which is substantially box shaped having two open opposed ends;
   b. a lower plate provided with a pin at each corner thereof extending perpendicular to the surface of said plate, said main body portion being slidably mounted on said pins; and
   c. a substantially hairpin shaped spring positioned along each side of said main body portion between said main body portion and said lower plate whereby said main body portion is resiliently biased away from said lower plate.

8. The end fitting of claim 7, wherein the end of said spring against said lower plate is offset from the end thereof.

9. The end fitting of claim 7, further comprising means for preventing said main body portion from sliding off said pins.

* * * * *